US010104325B2

United States Patent
Choi et al.

(10) Patent No.: US 10,104,325 B2
(45) Date of Patent: Oct. 16, 2018

(54) CHARGE PUMP AND DEVICES INCLUDING SAME

(71) Applicant: SAMSUNG ELECTRONICS CO., LTD., Suwon-Si, Gyeonggi-Do (KR)

(72) Inventors: Yong Suk Choi, Suwon-Si (KR); Hyuk Bin Kwon, Seoul (KR); Seok Yong Park, Hwaseong-Si (KR); Dong Jae Han, Seoul (KR); Dong Hun Heo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 196 days.

(21) Appl. No.: 15/194,732

(22) Filed: Jun. 28, 2016

(65) Prior Publication Data
US 2017/0013222 A1    Jan. 12, 2017

(30) Foreign Application Priority Data

Jul. 7, 2015    (KR) .................. 10-2015-0096635

(51) Int. Cl.
| H04N 5/376 | (2011.01) |
| H02M 3/07 | (2006.01) |
| H04N 5/369 | (2011.01) |
| H04N 5/374 | (2011.01) |

(52) U.S. Cl.
CPC ............ *H04N 5/3765* (2013.01); *H02M 3/07* (2013.01); *H04N 5/3698* (2013.01); *H04N 5/374* (2013.01); *H02M 2003/077* (2013.01)

(58) Field of Classification Search
CPC .... H04N 5/3765; H04N 5/374; H04N 5/3698; H02M 3/07; H02M 2003/077
See application file for complete search history.

(56) References Cited

U.S. PATENT DOCUMENTS

| 6,140,630 | A | * | 10/2000 | Rhodes ............. H01L 27/14609 |
| | | | | 250/208.1 |
| 6,400,211 | B1 | | 6/2002 | Yokomizo et al. |
| 8,232,835 | B2 | | 7/2012 | Kim et al. |
| 8,248,150 | B2 | | 8/2012 | Tadeparthy et al. |
| 8,289,424 | B2 | | 10/2012 | Okano |
| 8,461,910 | B2 | | 6/2013 | Nadimpalli |

(Continued)

FOREIGN PATENT DOCUMENTS

| JP | 3136862 | 8/1993 |
| JP | 2009055722 | 3/2009 |

(Continued)

OTHER PUBLICATIONS

KR 20080006375.*

*Primary Examiner* — Twyler Haskins
*Assistant Examiner* — Angel L Garces-Rivera
(74) *Attorney, Agent, or Firm* — Volentine, Whitt & Francos, PLLC (57) ABSTRACT

A charge pump provides an output voltage with reduced voltage ripple. The charge pump includes a first capacitor, a second capacitor, and a control circuit. The control circuit charges the first capacitor to one of a first voltage and a second voltage and the second capacitor to the other one of the first and second voltages using differential clock signals and an input voltage during each clock phase and outputs the higher one of the first and second voltages as an output voltage.

17 Claims, 9 Drawing Sheets

(56) References Cited

U.S. PATENT DOCUMENTS 8,593,213 B2  11/2013 Neugebauer
8,872,489 B2  10/2014 Ryu

FOREIGN PATENT DOCUMENTS

| JP | 4704103 | 3/2011 |
| JP | 4855084 | 11/2011 |
| KR | 1024137 | 3/2011 |
| KR | 20110043939 A | 4/2011 |

* cited by examiner

CHARGE PUMP AND DEVICES INCLUDING SAME

CROSS-REFERENCE TO RELATED APPLICATION

This application claims priority under 35 U.S.C. § 119(a) from Korean Patent Application No. 10-2015-0096635 filed on Jul. 7, 2015, the disclosure of which is hereby incorporated by reference.

BACKGROUND

Embodiments of the inventive concept relate to semiconductor devices and apparatuses that incorporate semiconductor devise. More particularly, embodiments of the inventive concept relate to charge pumps variously used in semiconductor devices. Charge pumps consistent with embodiments of the inventive concept reduce voltage ripple in an output voltage.

With continuous miniaturization of electronics and electrical devices, a multiplicity of functions has been integrated into different mobile devices. This multiplicity of functions often includes an ability to acquire still image and/or moving image information. In this context, many mobile devices include one or more image sensors. However, the function and performance of an image sensor included in a mobile device exercise great influence on the design and implementation of the mobile device. For example, technical improvements that reduce the power consumption and/or physical size of an image sensor chip are increasingly important.

Contemporary, semiconductor image sensor circuits (or "chips") that may be used to receive light (or more generally expressed, "to collect electromagnetic energy over a defined range of frequencies") usually include a pixel array, as well as circuits controlling the response of pixel array elements to incident light and further controlling the output of resulting electrical signals. For example, image sensor chips usually include so-called "row driver(s)" and "readout circuit(s)". In this context, an operating voltage supplied to a row driver may be significantly higher in level than other operating voltage(s) supplied to other circuits in an image sensor chip. In order to efficiently generate this type of higher level operating voltage, a so-called "charge pump" circuit may be used. The general use of charge pumps in different semiconductor applications is well understood, but charge pumps associated with an image sensor chip must not only operate with high reliability, but also provide an operating voltage with significantly low voltage ripple.

SUMMARY

According to some embodiments of the inventive concept, there is provided a charge pump including a first capacitor, a second capacitor, and a control circuit. The control circuit charges the first capacitor to one of a first voltage and a second voltage and the second capacitor to the other one of the first and second voltages using differential clock signals and an input voltage during each clock phase and outputs a higher one of the first and second voltages as an output voltage.

The control circuit may charge the first capacitor to the first voltage and the second capacitor to the second voltage higher than the first voltage at a first clock phase and may charge the first capacitor to the second voltage and the second capacitor to the first voltage at a second clock phase.

The control circuit may charge the first capacitor to the first voltage and the second capacitor to the second voltage at the same time in the first clock phase and may charge the first capacitor to the second voltage and the second capacitor to the first voltage at the same time in the second clock phase.

The control circuit may include a first switch circuit configured to control connection between an output terminal of the first capacitor and an output terminal of the charge pump using an output voltage of the second capacitor and a second switch circuit configured to control connection between an output terminal of the second capacitor and the output terminal of the charge pump using an output voltage of the first capacitor.

The first switch circuit may be a first transistor. The second switch circuit may be a second transistor. A body of the first transistor may be connected with a body of the second transistor. The control circuit may further include a third transistor and a fourth transistor which are connected in series between the output terminal of the first capacitor and the output terminal of the second capacitor. A gate of the third transistor may be connected to the output terminal of the second capacitor. A gate of the fourth transistor may be connected to the output terminal of the first capacitor. Bodies of the respective third and fourth transistors may be connected to the body of the first transistor.

According to other embodiments of the inventive concept, there is provided an image sensor including a pixel, a row driver configured to generate control signals for controlling the pixel using an operating voltage, and a voltage generator configured to generate the operating voltage. The voltage generator includes a regulator configured to generate a regulated voltage using a reference voltage and the operating voltage, a first capacitor, a second capacitor, and a control circuit. The control circuit charges the first capacitor to one of a first voltage and a second voltage and the second capacitor to the other one of the first and second voltages using differential clock signals and the regulated voltage during each clock phase and outputs a higher one of the first and second voltages as the operating voltage.

The control circuit may charge the first capacitor to the first voltage and the second capacitor to the second voltage higher than the first voltage at a first clock phase and may charge the first capacitor to the second voltage and the second capacitor to the first voltage at a second clock phase. The second voltage may be an integer multiple of the first voltage.

The image sensor may further include a pad connected to an output terminal of the voltage generator which outputs the operating voltage. Alternatively, the image sensor may further include a metal oxide semiconductor (MOS) capacitor connected to the output terminal of the voltage generator which outputs the operating voltage.

According to further embodiments of the inventive concept, there is provided an image processing system including an image sensor and a processor connected to the image sensor. The image sensor includes a pixel, a row driver configured to generate control signals for controlling the pixel using an operating voltage, and a voltage generator configured to generate the operating voltage. The voltage generator includes a regulator configured to generate a regulated voltage using a reference voltage and the operating voltage, a first capacitor, a second capacitor, and a control circuit.

The control circuit charges the first capacitor to one of a first voltage and a second voltage and the second capacitor to the other one of the first and second voltages using differential clock signals and the regulated voltage during each clock phase and outputs a higher one of the first and second voltages as the operating voltage.

The control circuit may charge the first capacitor to the first voltage and the second capacitor to the second voltage higher than the first voltage at a first clock phase and may charge the first capacitor to the second voltage and the second capacitor to the first voltage at a second clock phase.

The image processing system may further include a pad connected to an output terminal of the voltage generator which outputs the operating voltage and a capacitor connected between the pad and a ground.

According to still further embodiments of the inventive concept, there is provided a method of operating a charge pump receiving a regulated voltage and generating an output voltage. The charge pump includes a first capacitor, a second capacitor, and a control circuit. The method includes; charging the first capacitor to one of a first voltage and a second voltage, and charging the second capacitor to the other one of the first voltage and second voltage in response to differential clock signals and the regulated voltage during each of a first clock phase and a second clock phase, and outputting a higher one of the first voltage and second voltage as the output voltage.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION

Embodiments of the inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the scope of the inventive concept to those skilled in the art. Throughout the written description and drawings, like reference numbers and labels are used to denote like of similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
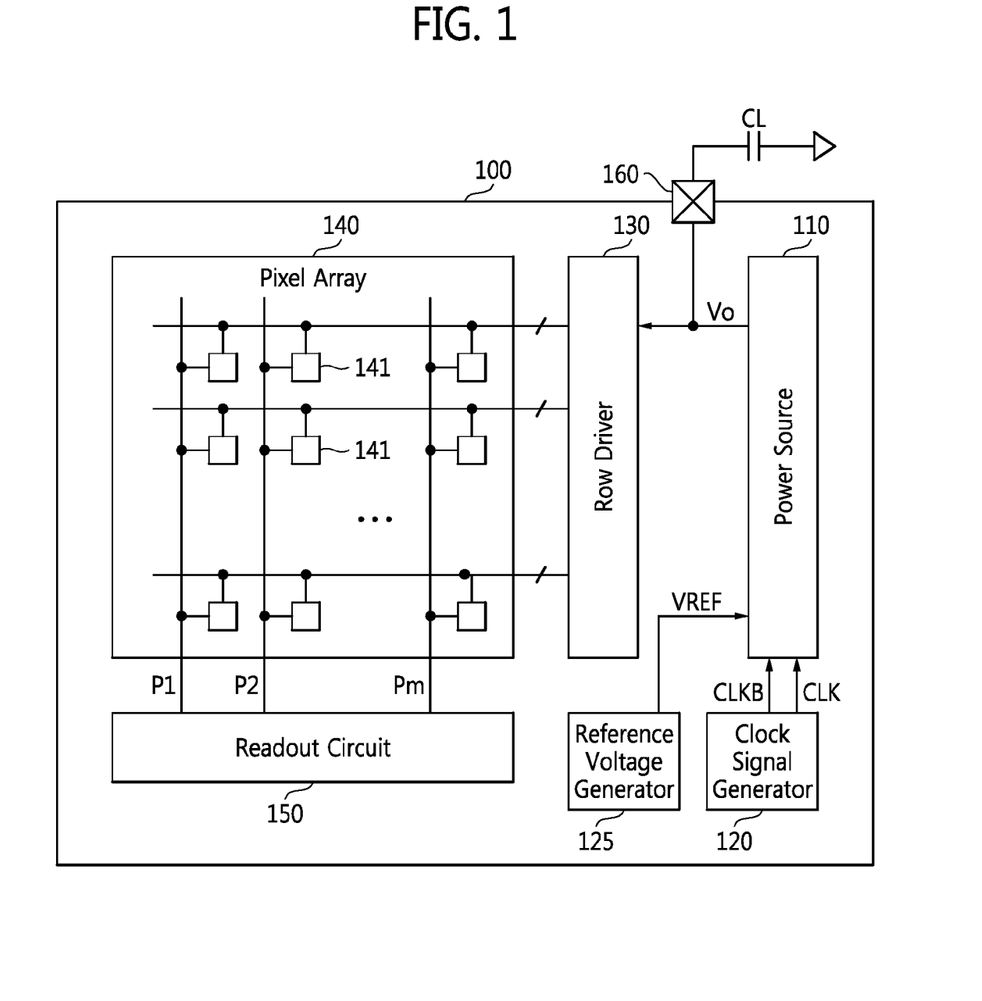
FIGS. 1 and 2 are respective block diagrams of various image sensor chips including a voltage generator according to embodiments of the inventive concept.

FIG. 1 is a block diagram of an image sensor chip including a voltage generator 110 according to certain embodiments of the inventive concept. Referring to FIG. 1, the image sensor 100 includes a voltage generator 110, a clock signal generator 120, a reference voltage generator 125, a row driver 130, a pixel array 140, and a readout circuit 150. The image sensor 100 may be implemented as an image sensor chip. The image sensor 100 may be a front side illumination (FSI) image sensor or a back side illumination (BSI) image sensor.

The voltage generator 110 may function as a power source, the voltage generator 110 may generate an operating voltage Vo that is provided to the row driver 130. However, this is just a convenient working example and the inventive concept is not restricted to only this type of embodiment.

The clock signal generator 120 may be used to generate differential clock signals CLK and CLKB applied to the voltage generator 110. At least one of the differential clock signals CLK and CLKB may be applied to at least one element (e.g., 150) included in the image sensor 100. For example, the clock signal generator 120 may generate the differential clock signals CLK and CLKB using a source clock signal output from a clock signal source (e.g., a phase locked loop (PLL) circuit).

The reference voltage generator 125 may be used to generate a reference voltage VREF that is also provided to the voltage generator 110. For example, the reference voltage generator 125 may be implemented as a bandgap voltage reference, but the inventive concept is not restricted to only this type of embodiment. The bandgap voltage reference may be a temperature-independent voltage reference circuit.

The row driver 130 may be used to generate control signals in response to the operating voltage Vo. For example, the row driver 130 may function as both a row driver and a decoder. Thus, in certain embodiments of the inventive concept, the row driver 130 may generate control signals for controlling the operation of respective pixels 141 arranged in the rows of the pixel array 140.

Figure 2:
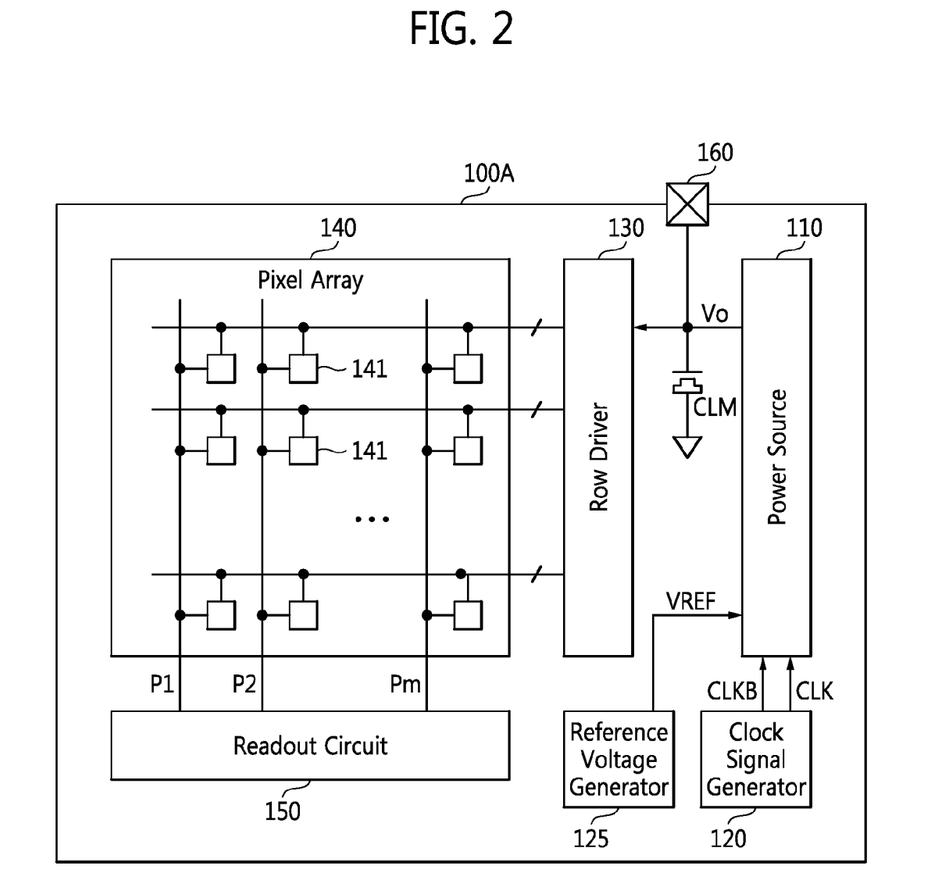
Figure 3:
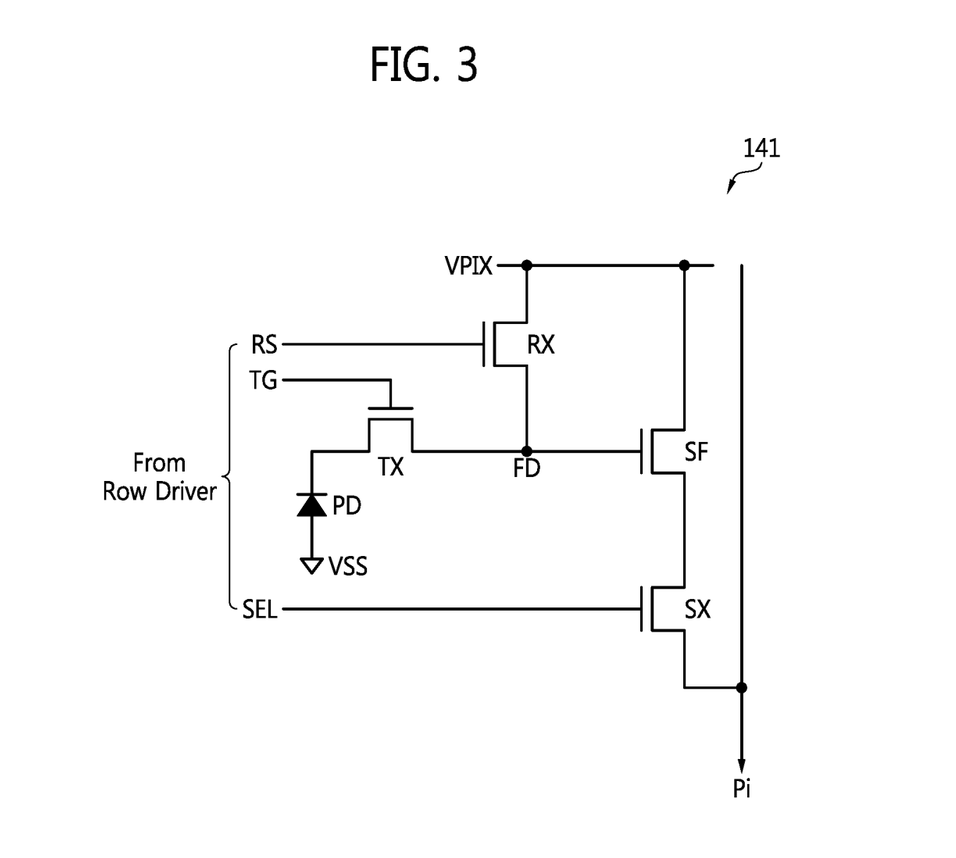
FIG. 3 is a circuit diagram illustrating a pixel that may be included in the image sensor chips of FIGS. 1 and 2 according to embodiments of the inventive concept.

That is, the pixel array 140 of FIGS. 1 and 2 include a plurality of the pixels 141. The structure of each pixel 141, for example, may include a single photoelectric conversion element PD and a plurality of transistors TX, RX, SF, and SX, as shown in FIG. 3. In other embodiments, each pixel 141 may include a plurality of photoelectric conversion elements. One of the photoelectric conversion elements may be a pixel which generates a long-exposure image signal and another one of the photoelectric conversion elements may be a pixel which generates a short-exposure image signal. Each of the pixels 141 may be implemented using a photodiode, a phototransistor, a pinned photodiode, or a photogate, but the inventive concept is not restricted to the current embodiments.

An analog pixel signal output from each pixel 141 in one of the columns of the pixel array 140 may be transmitted to the readout circuit 150 via one of column lines P1 through Pm. The readout circuit 150 may perform analog-to-digital (A/D) conversion on analog pixel signals received through the respective column lines P1 through Pm.

The image sensor 100 may also include a pad 160 connected to a voltage transmission line which communicates the operating voltage Vo. An external capacitor CL may be connected between the pad 160 and ground. The pad 160 may be a pin to which the external capacitor CL can be connected. In this context, the term "external" denotes a capacitor implemented outside the image sensor 100 (e.g., external to a semiconductor substrate, chip or device implementing the image sensor 100).

FIG. 2 is a block diagram of an image sensor chip including the voltage generator 110 according to another embodiment of the inventive concept. Apart from an internal capacitor CLM (e.g., a capacitor implemented, for example, as a metal oxide semiconductor (MOS) capacitor, internal to the structure of an image sensor 100A) replacing the external capacitor CL, the image sensor 100A of FIG. 2 is substantially similar to the image sensor 100 of FIG. 1.

FIG. 3 is a circuit diagram illustrating in one embodiment the pixel 141 (e.g., at least one pixel included in the pixel array 140) included in the image sensor chip 100 or 100A of FIG. 1 or 2 according to embodiments of the inventive concept. Referring to FIGS. 1, 2 and 3, the pixel 141 may include a photoelectric conversion element PD and associated transistors TX, RX, SF, and SX.

The row driver 130 may be used to generate a transfer control signal TG controlling the operation of the transfer transistor TX, a reset control signal RS controlling the operation of the reset transistor RX, and a selection signal SEL controlling the operation of the select transistor SX. In other words, the row driver 130 may generate the control signals TG, RS, and SEL in response to the operating voltage Vo provided from the voltage generator 110. For example, the row driver 130 may include drivers which generate the control signals TG, RS, and SEL for each row of the pixel array 140.

The reset transistor RX may be connected between a metal line (or a node) communicating a voltage VPIX and a floating diffusion node FD. The floating diffusion node FD may be a floating diffusion region. The transistor SF functions as a source follower and is connected between the metal line and the select transistor SX.

Although the reset transistor RX and the transistor SF are connected to the metal line communicating the voltage VPIX in the embodiment illustrated in FIG. 3, a first metal line connected with the reset transistor RX may be separate from a second metal line connected with the transistor SF in other embodiments. A voltage supplied to the first metal line may be different from a voltage supplied to the second metal line.

Figure 4:
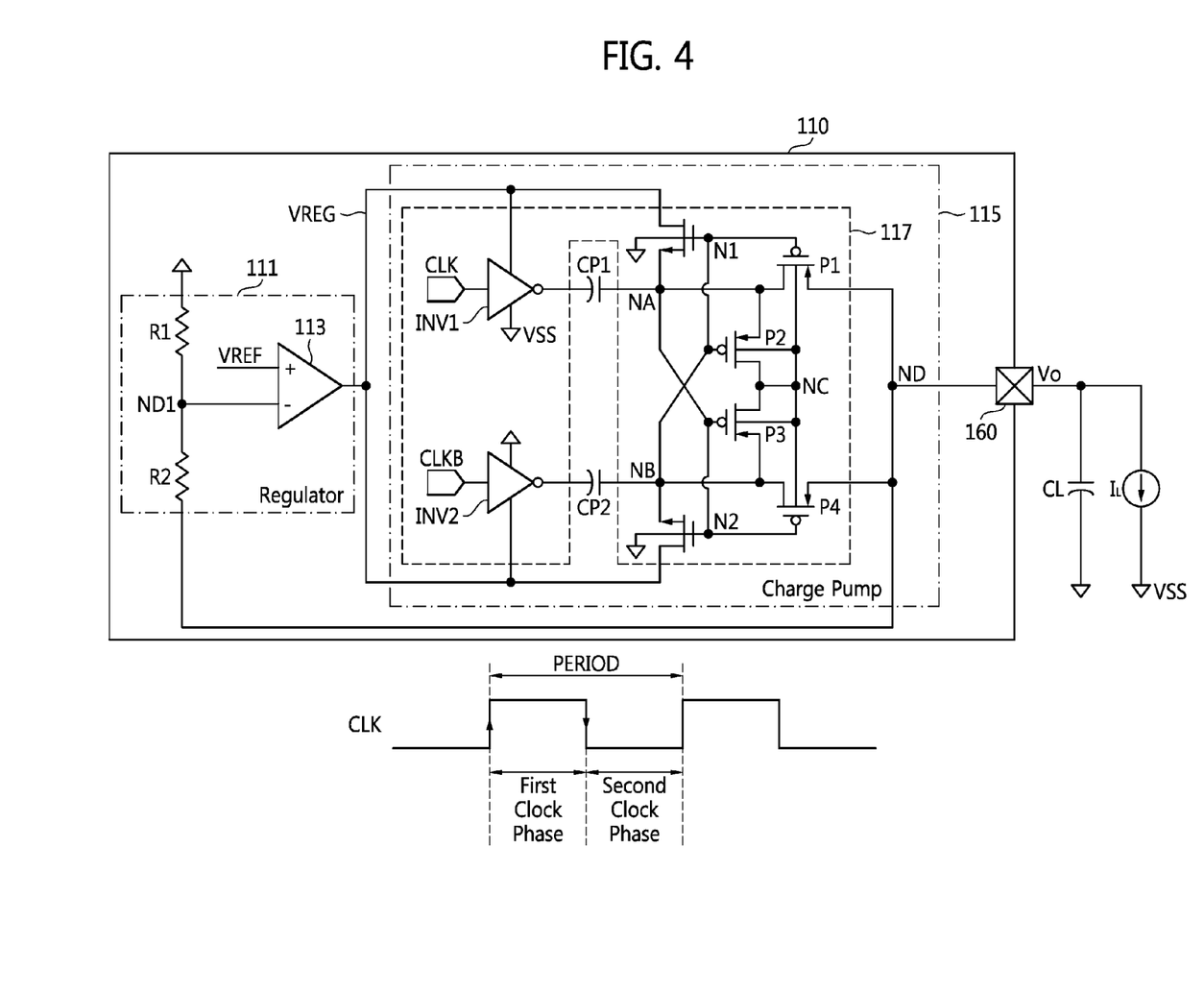
FIG. 4 is a circuit diagram further illustrating a voltage generator that may be included in the image sensor chips of FIGS. 1 and 2 according to embodiments of the inventive concept.
Figure 5:
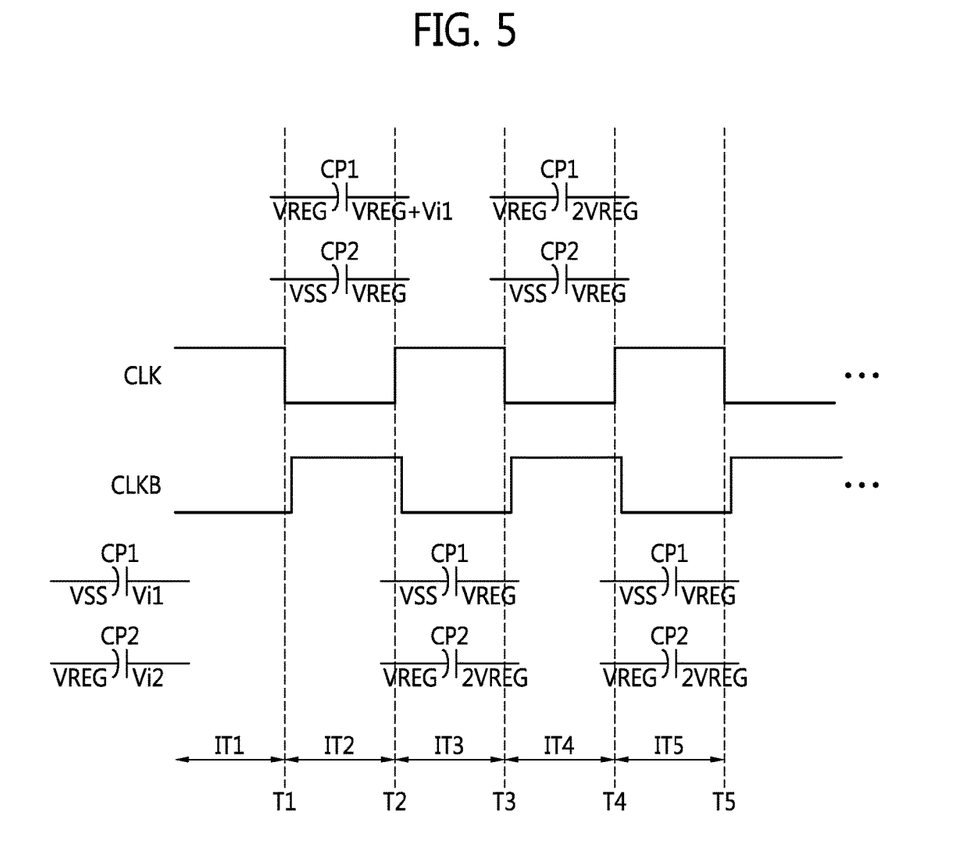
FIG. 5 is a waveform timing diagram illustrating differential clock signals and voltages used to control the charging of capacitors during operation of the voltage generator illustrated in FIG. 4.

FIG. 4 is a circuit diagram illustrating in one embodiment the voltage generator 110 of the image sensor chips 100 and 100A of FIGS. 1 and 2 according to certain embodiments of the inventive concept. FIG. 5 is a waveform diagram showing differential clock signals and capacitor charge voltages that further illustrate the operation of the voltage generator 110 of FIG. 4, and FIG. 6 is a voltage diagram illustrating the output voltage of the voltage generator 110 of FIG. 4 including voltage ripple.

Figure 6:
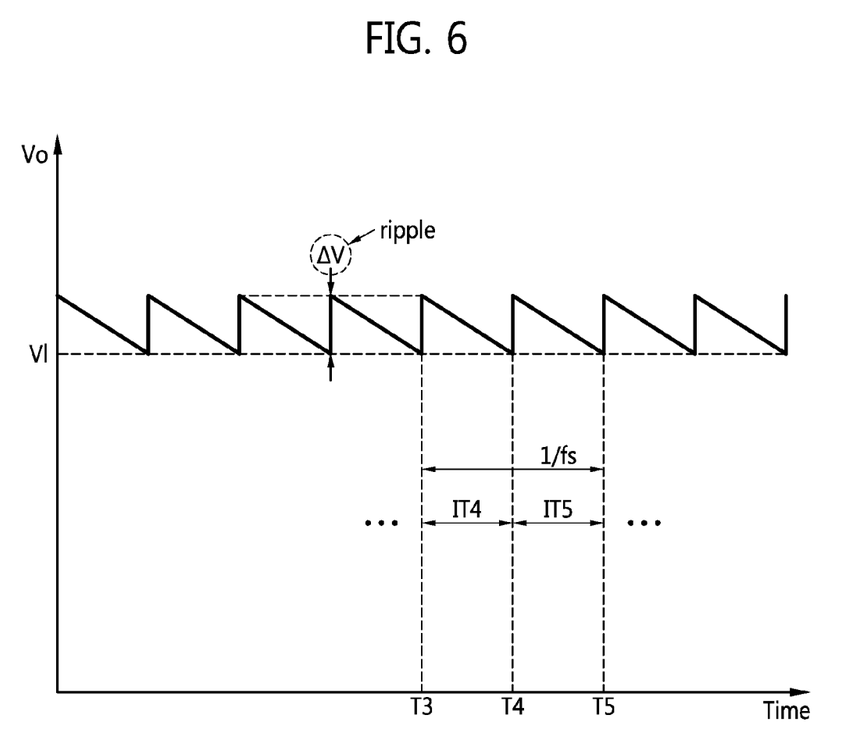
FIG. 6 is a voltage diagram showing an output voltage of the voltage generator illustrated in FIG. 4 including generated voltage ripple.

In relation to FIGS. 4, 5 and 6, the term "first clock phase" refers to a phase in which a clock signal CLK is at a high level (hereafter, "high"). The term "second clock phase" refers to a phase in which the clock signal CLK is at a low level (hereafter, "low"). Further, a single period for the clock signal CLK is assumed to include the first clock phase and the second clock phase. However, these are just conventions assumed to more clearly describe the operation of certain exemplary voltage generators consistent with embodiments of the inventive concept. Other conventions may be assumed for different embodiments of the inventive concept.

Referring to FIG. 4, the voltage generator 110 includes a regulator 111 and a charge pump 115. Here, the voltage generator 110 is assumed to have a structure using negative feedback.

The regulator 111 may be used to generate a regulated voltage VREG in response to the reference voltage VREF and output voltage Vo of the voltage generator 110. The regulator 111 include first and second resistors R1 and R2 and an amplifier 113. The voltage apparent at a node ND1 will be determined by the values and ratio of the first and second resistors R1 and R2. The amplifier 113 amplifies a difference between the reference voltage VREF received at a first input terminal (e.g., a positive input terminal) and a node voltage received at a second input terminal (e.g., a negative input terminal) in order to generate the regulated voltage VREG.

The charge pump 115 of FIG. 4 includes a first capacitor CP1, a second capacitor CP2, and a control circuit 117. In one example, each one of the first and second capacitors CP1 and CP2 may be implemented as a flying capacitor. The capacitance of the first capacitor CP1 may be the same as that of the second capacitor CP2. Here, the phrase "being the same" means being exactly the same, being substantially the same, and/or being the same within a defined error range.

The control circuit 117 may be used to control the charging and/or discharging (hereafter, "charge/discharge") of the first and second capacitors CP1 and CP2. For example, the control circuit 117 may charge, during each one of the first and second clock phases, either the first capacitor CP1 or the second capacitor CP2 using one or the other of a first voltage VREG and a second voltage 2VREG. This charging of the first capacitor CP1 and second capacitor CP2 is performed in response to the differential clock signals CLK and CLKB and the regulated voltage VREG provided by the regulator 111. In this manner, the voltage generator 110 outputs the "higher one" (e.g., the voltage having the higher level) of the first voltage VREG and the second voltage 2VREG as the output voltage Vo.

In the foregoing, it is assumed for example, that the second voltage 2VREG is an integer multiple of the first voltage VREG that is derived from the regulated voltage VREG provided by the regulator 111.

Thus, the control circuit 117 may charge the first capacitor CP1 using the first voltage VREG and charge the second capacitor CP2 using the second voltage 2VREG, higher than the first voltage VREG, during the first clock phase. Then, the control circuit 117 may charge the first capacitor CP1 using the second voltage 2VREG and charge the second capacitor CP2 using the first voltage VREG during the second clock phase.

Alternatively, the control circuit 117 may charge the first capacitor CP1 using the first voltage VREG and charge the second capacitor CP2 using the second voltage 2VREG at the same time during the first clock phase, and then charge the first capacitor CP1 using the second voltage 2VREG and the second capacitor CP2 using the first voltage VREG at the same time during the second clock phase. Here, the phrase "performing [two operations like charging or discharging] at the same time" means performing the two operations during overlapping time periods, performing the operations at least partially in parallel, and/or performing the operations simultaneously with a predetermined time difference.

As may be seen from FIG. 4, the elements INV1, CP1, N1, and P1 form a first branch, while elements INV2, CP2, N2, and P4 form a second branch. Although the external capacitor CL is connected to the pad 160 and a current source $I_L$ is connected to the pad 160 in the embodiment illustrated in FIG. 4, this is just an example. It is assumed that the current source $I_L$ is a model of current consumed by the row driver 130.

The operation of the voltage generator 110 will be described with reference to FIGS. 4 and 5. Referring to FIG. 5, it is assumed that after the phase of the clock signal CLK transitions, the phase of the complementary clock signal CLKB transitions. In other words, it is assumed that the clock signal generator 120 generates the differential clock signals CLK and CLKB having a predetermined time difference. In addition, it is assumed that the first capacitor CP1 has been charged to a first initial voltage Vi1 and that the second capacitor CP2 has been charged to a second initial voltage Vi2. The first initial voltage Vi1 may be the same as or different from the second initial voltage Vi2. It is assumed that the first and second initial voltages Vi1 and Vi2 are lower than the regulated voltage VREG (or in the illustrated example of FIG. 4 the first voltage VREG).

It is also assumed that when the charge pump 115 is implemented as a voltage doubler as an example of an A/D converter, the first and second capacitors CP1 and CP2 are configured to store electrical charge corresponding to the second voltage 2VREG. It is also assumed that the voltage of a second terminal NA of the first capacitor CP1 changes (i.e., increases or decreases) according to the voltage of a first terminal of the first capacitor CP1 when the clock signal CLK transits and the voltage of a second terminal NB of the second capacitor CP2 changes (i.e., increases or decreases) according to the voltage of a first terminal of the second capacitor CP2 when the complementary clock signal CLKB transits.

It is assumed that the voltages of both terminals of the first capacitor CP1 and the voltages of both terminals of the second capacitor CP2 are maintained during intervals IT1 through IT5. The voltages of the terminals of each of the first and second capacitors CP1 and CP2 are just examples and the inventive concept is not restricted to these examples.

During the first interval IT1, that is, while the clock signal CLK is high and the complementary clock signal CLKB is low; the voltage of the first terminal of the first capacitor CP1 is changed to a ground voltage VSS by the first inverter INV1 and the voltage of the second terminal NA of the first capacitor CP1 is maintained at the first initial voltage Vi1. Meanwhile, the voltage of the first terminal of the second capacitor CP2 is changed to the first voltage VREG by the second inverter INV2 and the voltage of the second terminal NB of the second capacitor CP2 is maintained at the second initial voltage Vi2.

When the clock signal CLK transitions from high to low at a first time T1, the voltage of the first terminal of the first capacitor CP1 is changed to the first voltage VREG by the first inverter INV1 and the voltage of the second terminal NA of the first capacitor CP1 is changed to the sum of the first voltage VREG and the first initial voltage Vi1. It is assumed that an N-channel MOS (NMOS) transistor N2 is turned ON by the voltage of the second terminal NA of the first capacitor CP1 and P-channel MOS (PMOS) transistors P3 and P4 are maintained in an OFF-state.

When the complementary clock signal CLKB transitions from low to high right after the first time T1, the voltage of the first terminal of the second capacitor CP2 is changed to the ground voltage VSS by the second inverter INV2 and the voltage of the second terminal NB of the second capacitor CP2 is maintained at the second initial voltage Vi2. Thereafter, the voltage of the second terminal NB of the second capacitor CP2 is changed to the first voltage VREG by the NMOS transistor N2 that has been turned ON. At this time, transistors N1, P1, and P2 are assumed to be in the OFF-state.

When the clock signal CLK transitions from low to high at a second time T2, the voltage of the first terminal of the first capacitor CP1 is changed to the ground voltage VSS by the first inverter INV1 and the voltage of the second terminal NA of the first capacitor CP1 is changed to the first initial voltage Vi1.

When the complementary clock signal CLKB transitions from high to low right after the second time T2, the voltage of the first terminal of the second capacitor CP2 is changed to the first voltage VREG by the second inverter INV2 and the voltage of the second terminal NB of the second capacitor CP2 is changed to the second voltage 2VREG. Accordingly, the NMOS transistor N1 is turned ON in response to the second voltage 2VREG. As a result, the voltage of the second terminal NA of the first capacitor CP1 is changed to the first voltage VREG.

When the voltage of the second terminal NA of the first capacitor CP1 is the first voltage VREG and the voltage of the second terminal NB of the second capacitor CP2 is the second voltage 2VREG, the MOS transistors N1, P3, and P4 are turned ON and the MOS transistors N2, P1, and P2 are in the OFF-state. Accordingly, the voltage of the second terminal NB of the second capacitor CP2, i.e., the second voltage 2VREG is output to the pad 160 as the operating voltage Vo.

When the clock signal CLK transitions from high to low at a third time T3, the voltage of the first terminal of the first capacitor CP1 is changed to the first voltage VREG by the first inverter INV1 and the voltage of the second terminal NA of the first capacitor CP1 is changed to the second voltage 2VREG. Accordingly, the MOS transistors P3 and P4 are turned off and the MOS transistor N2 is turned ON.

When the complementary clock signal CLKB transitions from low to high right after the third time T3, the voltage of the first terminal of the second capacitor CP2 is changed to the ground voltage VSS by the second inverter INV2 and the voltage of the second terminal NB of the second capacitor CP2 is changed to the first voltage VREG by the MOS transistor N2 that has been turned ON. Since the MOS transistors P1 and P2 are turned ON and the MOS transistor N1 is turned OFF, the voltage of the second terminal NA of the first capacitor CP1, i.e., the second voltage 2VREG is output to the pad 160 as the operating voltage Vo.

When the clock signal CLK transitions from low to high at a fourth time T4, the voltage of the first terminal of the first capacitor CP1 is changed to the ground voltage VSS by the first inverter INV1 and the voltage of the second terminal NA of the first capacitor CP1 is changed to the first voltage VREG. Accordingly, the MOS transistors P3 and P4 are turned ON and the MOS transistor N2 is turned OFF.

When the complementary clock signal CLKB transitions from high to low right after the fourth time T4, the voltage of the first terminal of the second capacitor CP2 is changed to the first voltage VREG by the second inverter INV2 and the voltage of the second terminal NB of the second capacitor CP2 is changed to the second voltage 2VREG.

Since the MOS transistors P1 and P2 are turned OFF and the MOS transistor N1 is turned ON, the voltage of the second terminal NA of the first capacitor CP1 becomes the first voltage VREG. Since the MOS transistors P3 and P4 are turned ON in response to the voltage of the second terminal NA of the first capacitor CP1, i.e., the first voltage VREG; the voltage of the second terminal NB of the second capacitor CP2, i.e., the second voltage 2VREG is output to the pad 160 as the operating voltage Vo.

Consequently, the second voltage 2VREG generated by the first branch or the second branch is output to the pad 160 as the operating voltage Vo during each clock phase. In other words, the second voltage 2VREG at the second capacitor CP2 is output as the operating voltage Vo while the first capacitor CP1 is being charged to the first voltage VREG in the first clock phase and the second voltage 2VREG at the first capacitor CP1 is output as the operating voltage Vo while the second capacitor CP2 is being charged to the first voltage VREG in the second clock phase.

As shown in FIG. 6, the voltage generator 110 outputs the second voltage 2VREG to the pad 160 as the operating voltage Vo during each clock phase, so that voltage ripple in the operating voltage Vo is reduced. In FIG. 6, the term "fs" denotes the frequency of the clock signal CLK. As shown in FIG. 4, the PERIOD of the clock signal CLK is assumed to correspond to the reciprocal of the frequency fs.

Since the voltage generator 110 outputs the second voltage 2VREG through an output terminal ND during each clock phase, the second voltage 2VREG is not discharged by the current source $I_L$. In other words, the output terminal ND is charged to the second voltage 2VREG during each clock phase. The output terminal ND may be connected to the pad 160.

The first switch circuit P1 controls the connection between the output terminal NA of the first capacitor CP1 and the node ND using the output voltage of the second capacitor CP2. The second switch circuit P4 controls the connection between the output terminal NB of the second capacitor CP2 and the node ND in response to the output voltage of the first capacitor CP1. Each of the switch circuits P1 and P2 may be implemented as a MOS transistor, e.g., a PMOS transistor. The bodies of the respective PMOS transistors P1 and P2 may be connected with each other.

The control circuit 117 may also include the third MOS transistor P2 and the fourth MOS transistor P3 connected in series between the second terminal NA of the first capacitor CP1 and the second terminal NB of the second capacitor CP2. A gate of the third MOS transistor P2 may be connected to the second terminal NB of the second capacitor CP2 and a gate of the fourth MOS transistor P3 may be connected to the second terminal NA of the first capacitor CP1. The bodies of the respective MOS transistors P1, P2, P3, and P4 may be connected in common to a node NC. The bodies of the respective MOS transistors N1 and N2 may be connected to the ground.

Figure 7:
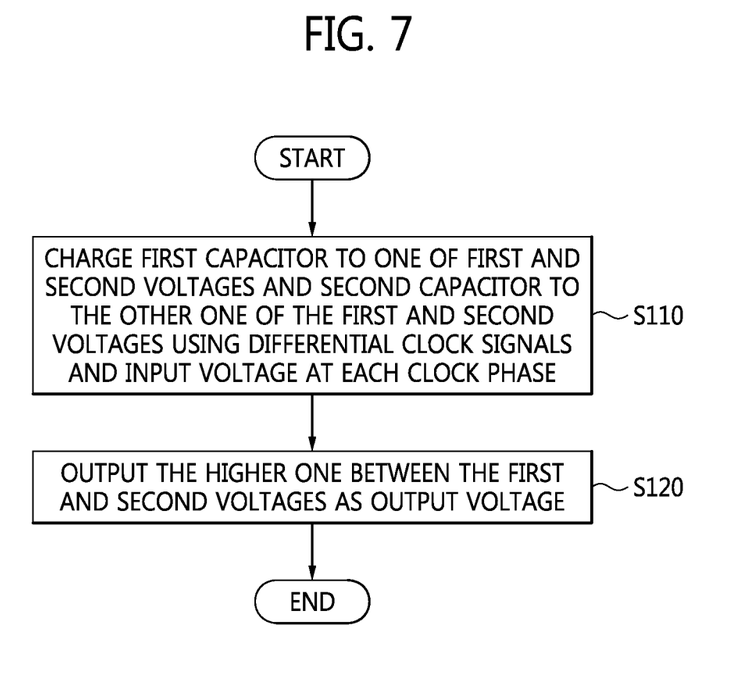
FIG. 7 is a general flowchart summarizing the operation of the voltage generator illustrated in FIG. 4.

FIG. 7 is a flowchart summarizing the operation of the voltage generator 110 illustrated in FIG. 4 according to certain embodiments of the inventive concept. Referring collectively to FIGS. 1 through 7, the voltage generator 110 charges the first capacitor CP1 to one of the first and second voltages VREG and 2VREG and the second capacitor CP2 to the other one of the first and second voltages VREG and 2VREG using differential clock signals CLK and CLKB and the input voltage VREG during each clock phase (S110).

The voltage generator 110 then outputs the higher one between the first and second voltages VREG and 2VREG to the row driver 130 as the output voltage Vo during each clock phase (S120).

Figure 8:
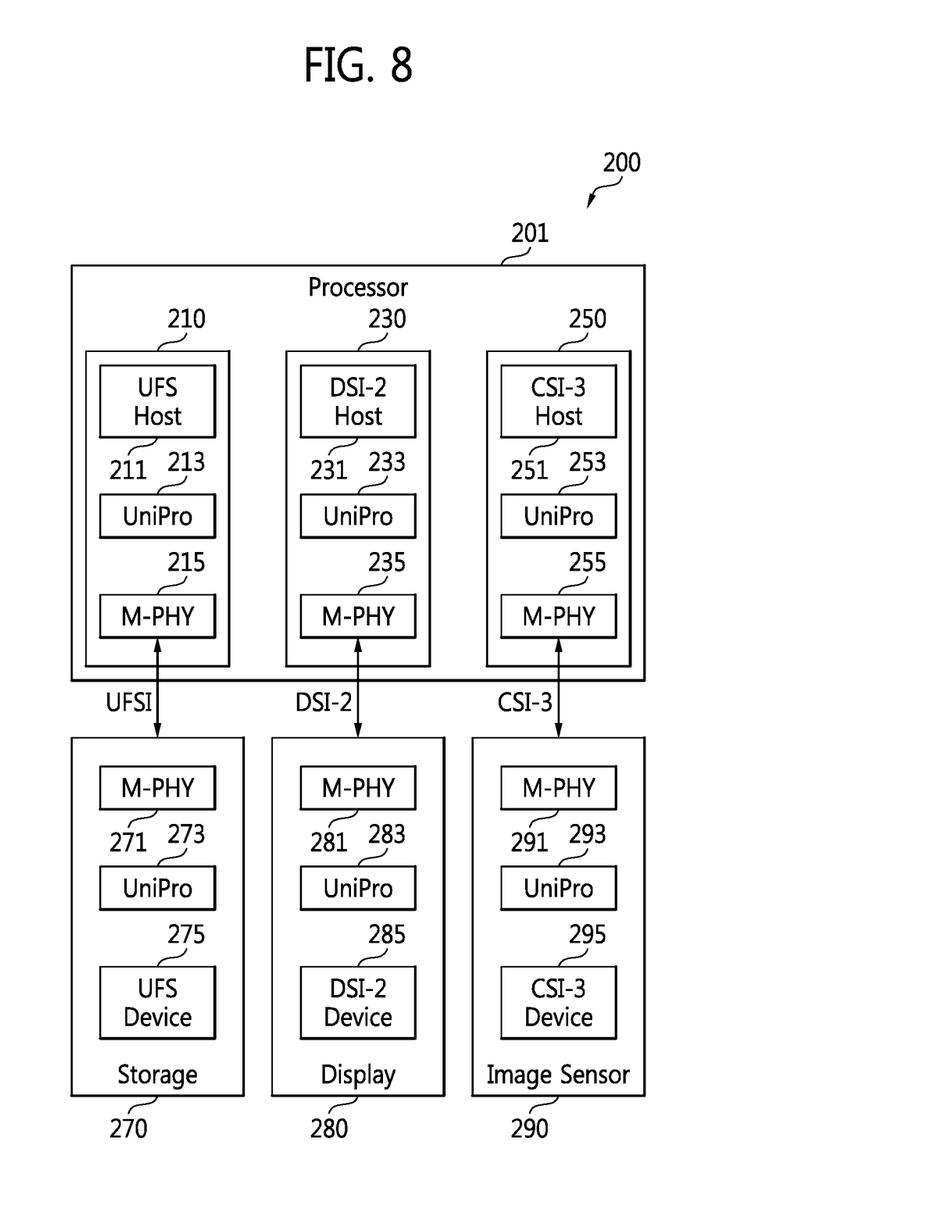
FIGS. 8 and 9 are respective block diagrams of image processing systems including one or more image sensor chips, like the ones illustrated in FIGS. 1 and 2, according to embodiments of the inventive concept.

FIG. 8 is a block diagram of an image processing system 200 including an image sensor chip like the image sensor chip 100 or 100A of FIGS. 1 and 2 according to embodiments of the inventive concept. Referring to FIGS. 1 through 8, the image processing system 200 may be implemented as a mobile device. The image processing system 200 may include a processor 201, a storage 270, a display 280, and an image sensor 290.

The mobile device including the image sensor 290 may be a cellular phone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book. The image sensor 290 may refer to the image sensor chip 100 or 100A (collectively denoted by reference numeral 100) described with reference to FIGS. 1 through 7.

The processor 201 may control the storage 270, the display 280, and the image sensor 290. The processor 201 may be implemented as an integrated circuit (IC) or a system on chip (SoC). The processor 201 may include host devices 210, 230, and 250. Here, a host device may be a hardware component or a circuit formed in the processor 201.

The first host device 210 may control the operation of the universal flash storage (UFS) 270 through a USF interface (UFSI). The first host device 210 may include a UFS host 211, a link layer such as mobile industry processor interface (MIPI) UniPro[SM], and a physical layer 215 such as MIPI M-PHY[SM]. MIPI UniPro[SM] may be replaced with MIPI low latency interface (LLI). A UFS interconnect (UIC) layer may include either MIPI UniPro[SM] or MIPI LLI and MIPI M-PHY[SM].

The UFS 270 may include a MIPI M-PHY 271, UniPro 273, and a UFS device 275. The MIPI M-PHY 271 may control the transmission of data between the UFSI and the UniPro 273. The UniPro 273 may control data transmission between the MIPI M-PHY 271 and the UFS device 275. The UFS device 275 may be a flash-based memory (e.g., a NAND flash memory or a NOR flash memory).

The second host device 230 may control the operation of the display 280 through a display serial interface (DSI)-2. The second host device 230 may include a DSI-2 host 231, a link layer 233 such as MIPI UniPro$^{SM}$, and a physical layer 235 such as MIPI M-PHY$^{SM}$.

The display 280 may include a MIPI M-PHY 281, UniPro 283, and a DSI-2 device 285. As described above, UniPro 233 and 283 may be replaced with MIPI LLI. The MIPI M-PHY 281 may control data transmission between the DSI-2 and the UniPro 283. The UniPro 283 may control data transmission between the MIPI M-PHY 281 and the DSI-2 device 285. The DSI-2 device 285 may be a display panel. The display panel may be a thin film transistor-liquid crystal display (TFT-LCD) panel, a light emitting diode (LED) display panel, an organic LED (OLED) display panel, an active-matrix OLED (AMOLED) display panel, or a flexible display panel.

The third host device 250 may control the operation of the image sensor 290 through camera serial interface (CSI)-3. The third host device 250 may include a CSI-3 host 251, a link layer 253 such as MIPI UniPro$^{SM}$, and a physical layer 255 such as MIPI M-PHY$^{SM}$.

The image sensor 290 may include a MIPI M-PHY 291, UniPro 293, and a CSI-3 device 295. As described above, UniPro 253 and 293 may be replaced with MIPI LLI. The MIPI M-PHY 291 may control data transmission between the CSI-3 and the UniPro 293. The UniPro 293 may control data transmission between the MIPI M-PHY 291 and the CSI-3 device 295. The CSI-3 device 295 may include a pixel array and peripheral circuits which process pixel signals output from the pixel array.

Figure 9:
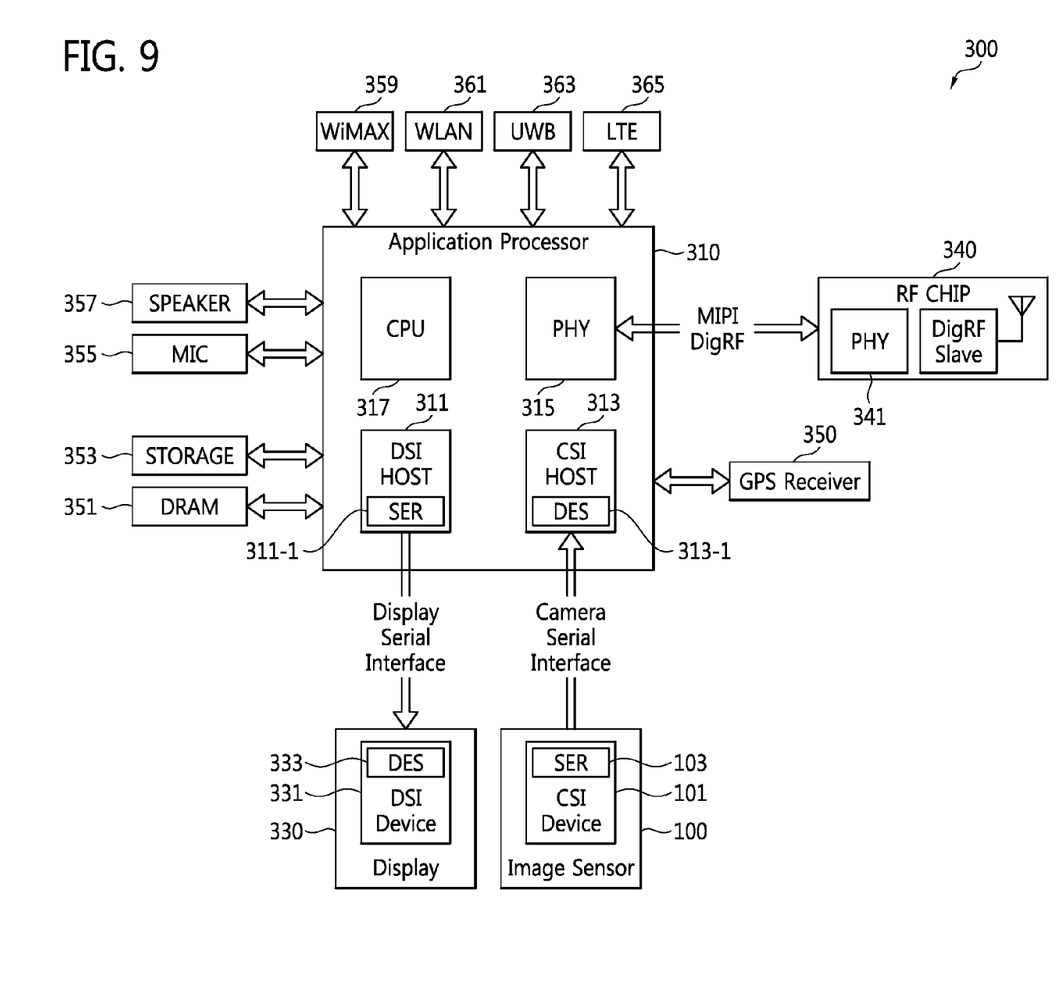

FIG. 9 is a block diagram of an image processing system 300 including an image sensor like the image sensor chip 100 and 100A of FIGS. 1 and 2 according to embodiments of the inventive concept. Referring to FIGS. 1 through 7 and FIG. 9, the image processing system 300 may be implemented as a mobile device which can use MIPI®. The image processing system 300 may include an application processor (AP) 310, the image sensor 100, and a display 330.

A CSI host 313 in the AP 310 may perform serial communication with a CSI device 101 in the image sensor 100 through CSI. A deserializer (DES) 313-1 and a serializer (SER) 103 may be included in the CSI host 313 and the CSI device 101, respectively.

A DSI host 311 in the AP 310 may perform serial communication with a DSI device 331 in the display 330 through DSI. A SER 311-1 and a DES 333 may be included in the DSI host 311 and the DSI device 331, respectively. The DES and the SER may process electrical signals or optical signals. The image processing system 300 may also include a radio frequency (RF) chip 340 communicating with the AP 310. A physical layer (PHY) 315 in the AP 310 and a PHY 341 in the RF chip 340 may communicate data with each other according to MIPI DigRF. The RF chip 340 may include an antenna and a DigRF slave. The AP 310 may also include a central processing unit (CPU) 317 which controls the other elements 311, 313, and 315.

The image processing system 300 may further include a global positioning system (GPS) receiver 350, a memory 351 such as dynamic random access memory (DRAM), a data storage 353 formed of non-volatile memory such as NAND flash memory, a microphone (MIC) 355, and/or a speaker 357.

The image processing system 300 may communicate with external devices using at least one communication protocol or standard, e.g., worldwide interoperability for microwave access (WiMAX) 359, wireless local area network (WLAN) 361, ultra-wideband (UWB) 363, or long term evolution (LTE™) 365. The image processing system 300 may also communicate with external devices using Bluetooth or Wi-Fi.

As described above, according to embodiments of the inventive concept, a charge pump may be provided that generally reduces voltage ripple in an output voltage. In addition, a voltage generator including the charge pump does not need a separate switch circuit for outputting a charged voltage to a capacitor. Therefore, the area of the voltage generator and the size of an image sensor chip including the voltage generator may be reduced.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. A charge pump receiving a regulated voltage and generating an output voltage, the charge pump comprising:
   a first capacitor, a second capacitor, and a control circuit,
   wherein the control circuit is configured to charge the first capacitor to one of a first voltage and a second voltage and to charge the second capacitor to the other one of the first voltage and second voltage in response to differential clock signals and the regulated voltage during each of a first clock phase and a second clock phase, and
   the control circuit is further configured to output a higher one of the first voltage and second voltage as the output voltage and comprises;
   a first switch circuit configured to control connection between an output terminal of the first capacitor and an output terminal of the charge pump using a voltage output by the second capacitor; and
   a second switch circuit configured to control connection between an output terminal of the second capacitor and the output terminal of the charge pump using a voltage output by the first capacitor.

2. The charge pump of claim 1, wherein the second voltage is higher than the first voltage,
   the control circuit charges the first capacitor to the first voltage and charges the second capacitor to the second voltage during the first clock phase, and
   the control circuit charges the first capacitor to the second voltage and charges the second capacitor to the first voltage during the second clock phase.

3. The charge pump of claim 2, wherein the control circuit charges the first capacitor to the first voltage and charges the second capacitor to the second voltage at the same time during the first clock phase, and
   the control circuit charges the first capacitor to the second voltage and charges the second capacitor to the first voltage at the same time during the second clock phase.

4. The charge pump of claim 1, wherein the first switch circuit is a first transistor, the second switch circuit is a second transistor, and a body of the first transistor is connected with a body of the second transistor.

5. The charge pump of claim 4, wherein the control circuit further comprises:
   a third transistor and a fourth transistor connected in series between the output terminal of the first capacitor and the output terminal of the second capacitor, wherein a gate of the third transistor is connected to the output terminal of the second capacitor, a gate of the fourth transistor is connected to the output terminal of the first capacitor, and bodies of the respective third and fourth transistors are connected to the body of the first transistor.

6. An image sensor comprising:
a pixel;
a row driver that generates control signals controlling operation of the pixel in response to an operating voltage; and
a voltage generator that generates the operating voltage, wherein the voltage generator comprises:
a regulator that generates a regulated voltage in response to a reference voltage and the operating voltage;
a first capacitor, a second capacitor, and a control circuit,
wherein the control circuit charges the first capacitor to one of a first voltage and a second voltage higher than the first voltage,
and charges the second capacitor to the other one of the first voltage and second voltage in response to differential clock signals and the regulated voltage during each of a first clock phase and a second clock phase, and
the control circuit outputs a higher one of the first voltage and second voltage as the output voltage, charges the first capacitor to the first voltage, charges the second capacitor to the second voltage during the first clock phase, and charges the first capacitor to the second voltage and the second capacitor to the first voltage during the second clock phase.

7. The image sensor of claim 6, wherein the control circuit charges the first capacitor to the first voltage and the second capacitor to the second voltage at the same time during the first clock phase, and charges the first capacitor to the second voltage and the second capacitor to the first voltage at the same time during the second clock phase.

8. The image sensor of claim 6, wherein the second voltage is an integer multiple of the first voltage.

9. The image sensor of claim 6, further comprising:
a pad connected to an output terminal of the voltage generator that outputs the operating voltage.

10. The image sensor of claim 6, further comprising:
a metal oxide semiconductor (MOS) capacitor connected to an output terminal of the voltage generator that outputs the operating voltage.

11. The image sensor of claim 6, wherein the control circuit comprises:
a first switch circuit controlling a connection between an output terminal of the first capacitor and an output terminal of the voltage generator that outputs the operating voltage, using an output voltage of the second capacitor; and
a second switch circuit controlling a connection between an output terminal of the second capacitor and the output terminal of the voltage generator using an output voltage of the first capacitor.

12. The image sensor of claim 11, wherein the first switch circuit is a first transistor, the second switch circuit is a second transistor, and a body of the first transistor is connected with a body of the second transistor.

13. The image sensor of claim 12, wherein the control circuit further comprises:
a third transistor and a fourth transistor connected in series between the output terminal of the first capacitor and the output terminal of the second capacitor,
wherein a gate of the third transistor is connected to the output terminal of the second capacitor, a gate of the fourth transistor is connected to the output terminal of the first capacitor, and bodies of the respective third and fourth transistors are connected to the body of the first transistor.

14. A method of operating a charge pump receiving a regulated voltage and generating an output voltage, the charge pump comprising a first capacitor, a second capacitor, and a control circuit, and the method comprising:
charging the first capacitor to one of a first voltage and a second voltage higher than the first voltage, and charging the second capacitor to the other one of the first voltage and second voltage in response to differential clock signals and the regulated voltage during each of a first clock phase and a second clock phase;
outputting a higher one of the first voltage and second voltage as the output voltage;
charging the first capacitor to the first voltage and charging the second capacitor to the second voltage during the first clock phase; and
charging the first capacitor to the second voltage and charging the second capacitor to the first voltage during the second clock phase.

15. The method of claim 14, wherein the charging of the first capacitor to the first voltage and the charging of the second capacitor to the second voltage occurs at the same time during the first clock phase, and
the charging of the first capacitor to the second voltage and the charging of the second capacitor to the first voltage occurs at the same time during the second clock phase.

16. The method of claim 14, further comprising:
controlling a connection between an output terminal of the first capacitor and an output terminal of the charge pump using a first switch circuit responsive to a voltage output by the second capacitor; and
controlling a connection between an output terminal of the second capacitor and the output terminal of the charge pump using a second switch circuit responsive to a voltage output by the first capacitor.

17. The method of claim 16, wherein the first switch circuit is a first transistor, the second switch circuit is a second transistor, and a body of the first transistor is connected with a body of the second transistor.

* * * * *